Oct. 12, 1965 E. L. SCHULTZ 3,211,986

SQUARE WAVE FREQUENCY DOUBLER

Filed Aug. 2, 1961

INVENTOR.
ELMER L. SCHULTZ
BY Moody and Harris
ATTORNEYS 3,211,986

SQUARE WAVE FREQUENCY DOUBLER

Elmer L. Schultz, Marion, Iowa, assignor to Collins Radio Company, Cedar Rapids, Iowa, a corporation of Iowa Filed Aug. 2, 1961, Ser. No. 128,878
1 Claim. (Cl. 321—69)

This invention relates to a square wave frequency doubling circuit and more particularly to a circuit for receiving a square wave input signal and producing a square wave output signal the frequency of which is twice that of the input signal.

While many frequency doubling circuits have been proposed or utilized heretofore, no simple yet efficient circuit has been proposed or utilized heretofore for receiving a square wave signal and producing a frequency doubled square wave output signal.

It is therefore an object of this invention to provide a novel square wave frequency doubling circuit that is simple in construction yet efficient in operation.

It is another object of this invention to provide a square wave doubling circuit having a saturable reactor and a bridge rectifier connected so as to produce an output square wave signal that is twice that of a square wave input signal.

With these and other objects in view which will become apparent to one skilled in the art as the description proceeds this invention resides in the novel construction, combination and arrangement of parts substantially as hereinafter described and more particularly defined by the appended claim, it being understood that such changes in the precise embodiment of the herein disclosed invention may be submitted as come within the scope of the claim.

Figure 1:
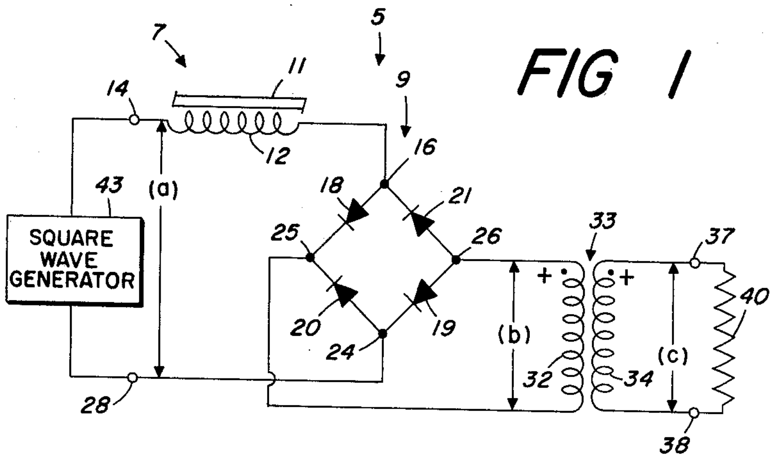
Figure 2:
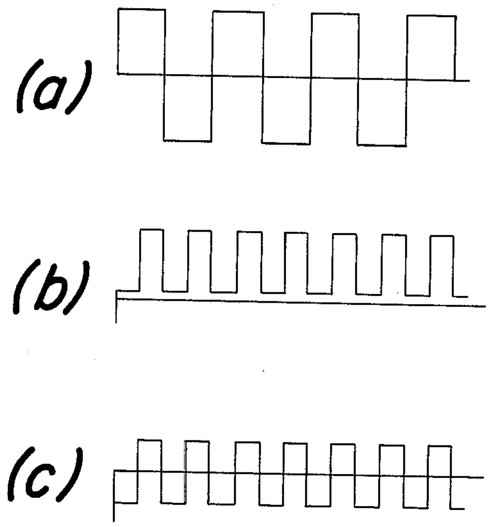

The accompanying drawing illustrates on complete example of the embodiment of the invention constructed according to the best mode so far devised for the practical application of the principles thereof, and in which:

FIGURE 1 is a schematic presentation of the square wave doubler of this invention; and FIGURE 2 is a series of waveforms taken at designated points in the schematic of FIGURE 1.

Referring now to the drawing, the numeral 5 designates generally the frequency doubler of this invention, which doubler includes saturable reactor 7 and a rectifier bridge 9.

Saturable reactor 7 includes a saturable core 11 having retentive and rectangular hysteresis properties, and a winding 12 wound about core 11 with one end connected to input terminal 14 and the other end connected to input junction 16 of bridge rectifier 9.

Bridge rectifier 9 may be conventional, that is, it may consist of four diodes 18, 19, 20 and 21 connected so that diodes 18 and 19 are in series and so that diodes 20 and 21 are in series. As shown in FIGURE 1, the plate of diode 18 and the cathode of diode 21 may be connected at input junction 16, the cathode of diode 19 and the plate of diode 20 may be connected at input junction 24, the cathodes of diodes 18 and 20 may be connected at output junction 25, and the plates of diodes 19 and 21 may be connected at output junction 26.

Input junction 24 of bridge rectifier 9 may be directly connected to input terminal 28, while output junctions 25 and 26 may be connected to primary winding 32 of transformer 33. The secondary winding 34 of transformer 33 may be connected to output terminals 37 and 38, which terminals may have an output load 40 connected thereacross.

In operation, when a square wave signal having a waveform as shown in FIGURE 2*a*, for example, is coupled to input terminals 14 and 28 from a square wave generator 43, saturable reactor 7 prevents current flow through bridge rectifier 9 until core 11 becomes saturated. When core 11 saturates, however, current flow is established during the remainder of the positive alternation from the power source 43 through winding 12, diode 18, primary 32 and diode 19 back to the power source.

At the start of the negative alternation, saturable reactor 7 again prevents current flow through bridge rectifier 9 until core 11 is caused to reset in the opposite direction and again is saturated. When core 11 has again become saturated, current flow is established for the remainder of the negative alternation from power source 43 through diode 20, primary 32, diode 21, and winding 12 back to the power source.

The developed output signal from output junctions 25 and 26 of bridge rectifier 9 is thus twice the frequency of the input signal, as shown by FIGURE 2*b*, since the required set and reset of core 11 during each alternation prevents current flow for a portion of each said alternation.

As also shown by FIGURE 2*b*, however, the output signal is constantly above the zero reference due to a small magnetizing current flowing in the circuit even when core 11 is not saturated. This zero reference can be restored, however, by coupling the output signal through transformer 33.

It is to be appreciated, of course, that the square wave input signal must have a magnitude sufficiently large to saturate core 11 in order to establish the necessary current flow through bridge rectifier 9 during a portion of each alternation.

It is also to be appreciated that if the square wave input signal is of a predetermined frequency such that the core saturates substantially at one half the time interval of each alternation, then the output from terminals 37 and 38 of the circuit will be symmetrical (that is, the alternations will be of equal width) since saturable reactor 7 will prevent current flow during the first half of each alternation of the input signal and permit current flow during the second half of each alternation.

In other words, if a saturable reactor is selected with a known value $v$ of volts per turn at a specific frequency $f$ to saturate the core after a time interval $t$, which interval is equal to the time duration of each alternation of the input signal, utilization of such a saturable reactor with one half as many turns thereon will cause saturation of the core substantially at $t/2$, that is, at the midpoint of each alternation.

It has been found that for a square wave input signal of 400 cycles per second having a 30 volt square peak-to-peak signal magnitude, a square wave doubler having a bridge rectifier utilizing 1N270 diodes and a saturable core supporting 21.1 millivolts per turn (which could, for example, be a commercially available core sold by Magnetics, Incorporated and designated as core number 51000–2A) with 350 turns wound thereon, produces a square wave output signal that is symmetrical and twice the frequency of the 400 c.p.s. input signal.

In view of the foregoing, it should be evident to those skilled in the art that the frequency doubler of this invention provides a novel doubler that is simple in construction yet reliable in operation for receiving a square wave input signal and producing a square wave output signal that is twice the frequency of the input signal.

What is claimed as my invention is:

A square wave frequency doubler circuit, comprising: first and second input terminals adapted to be connected to a square wave generating source of predetermined frequency; a bridge rectifier having a pair of input junctions and a pair of output junctions; output terminal means connected with said output junctions of said bridge rectifier; means connecting one input terminal to one input junction of said bridge rectifier; and saturable reactor means having a saturable core and a winding which causes said saturable reactor to saturate at the midpoint of each alternation of the square wave generating source and having one end of which is connected to the other input terminal and the other end of which is connected to the other input junction of said bridge rectifier whereby a received square wave signal of a predetermined frequency causes said core to saturate substantially at the midpoint of each alternation of said received signal to thereby produce a square wave output at said output junctions that is symmetrical and twice the frequency of said received signal.

References Cited by the Examiner

UNITED STATES PATENTS

| | | | |
|---|---|---|---|
| 2,215,893 | 9/40 | Walker et al. | 321—69 |
| 2,420,213 | 5/47 | Walker | 321—69 |
| 2,887,644 | 5/59 | Ogle | 321—69 |

LLOYD McCOLLUM, *Primary Examiner.*

SAMUEL BERNSTEIN, *Examiner.*